Nov. 10, 1959    J. R. DAVEY    2,912,582
DIODE COMPARISON GATE
Filed Dec. 18, 1956    3 Sheets-Sheet 2

INVENTOR
J. R. DAVEY
BY
John E. Cassidy
ATTORNEY

Nov. 10, 1959     J. R. DAVEY     2,912,582
DIODE COMPARISON GATE

Filed Dec. 18, 1956     3 Sheets-Sheet 3

INVENTOR
J. R. DAVEY
BY
John E. Cassidy
ATTORNEY

United States Patent Office 2,912,582
Patented Nov. 10, 1959.

2,912,582

DIODE COMPARISON GATE

James R. Davey, Franklin Township, Somerset County, N.J., assignor to Bell Telephone Laboratories, Incorporated, New York, N.Y., a corporation of New York Application December 18, 1956, Serial No. 629,435

4 Claims. (Cl. 250—27)

This invention is an improved diode gate circuit for use particularly in high speed electrical systems such as computing systems and signaling systems.

An object of the invention is the improvement of diode gates.

More specifically the invention is an improved general purpose diode gate circuit, known in one embodiment as a comparison gate. In one of its numerous possible applications, it may be employed for instance in selectively controlling the passage of two-condition signal elements to a signal receiver, incident to the comparison of one or the other of two potential conditions impressed thereon, during a signal interval, with one or the other of two testing potentials, to determine which of the two potential signaling conditions is being applied momentarily to the circuit.

Reference is made to D. E. Branson-W. T. Rea application Serial No. 404,165, filed January 15, 1954, now Patent No. 2,784,397, granted March 5, 1957, which shows a number display device in which received binary code signal combinations are translated into a display of corresponding multidigit decimal numbers. That application is incorporated herein, by reference, as though fully disclosed herein. It is contemplated that, in one embodiment, the diode comparison gate of the present application may serve as a binary code signal comparison gate to perform the function performed by the binary code comparison gate disclosed in the identified patent application.

The present comparison gate circuit has at least one important advantage over presently known comparison gate circuits. That advantage is that its impedance does not place any definite limit on the pulse energy which may be employed without losing the discrimination between wanted and unwanted output. As a consequence, the current magnitude of a pulse applied to the gate need not be limited, as was heretofore the case. In the gates heretofore known the pulse current was required to be limited by a non-symmetrical condition of the gate. This will be made clear hereinafter.

The invention may be understood from the following description and reference to the associated drawings, which taken together disclose a preferred embodiment in which the invention is presently incorporated. It is to be understood, however, that the invention may be incorporated in other embodiments as will be readily understood by those skilled in the art.

Figure 1:
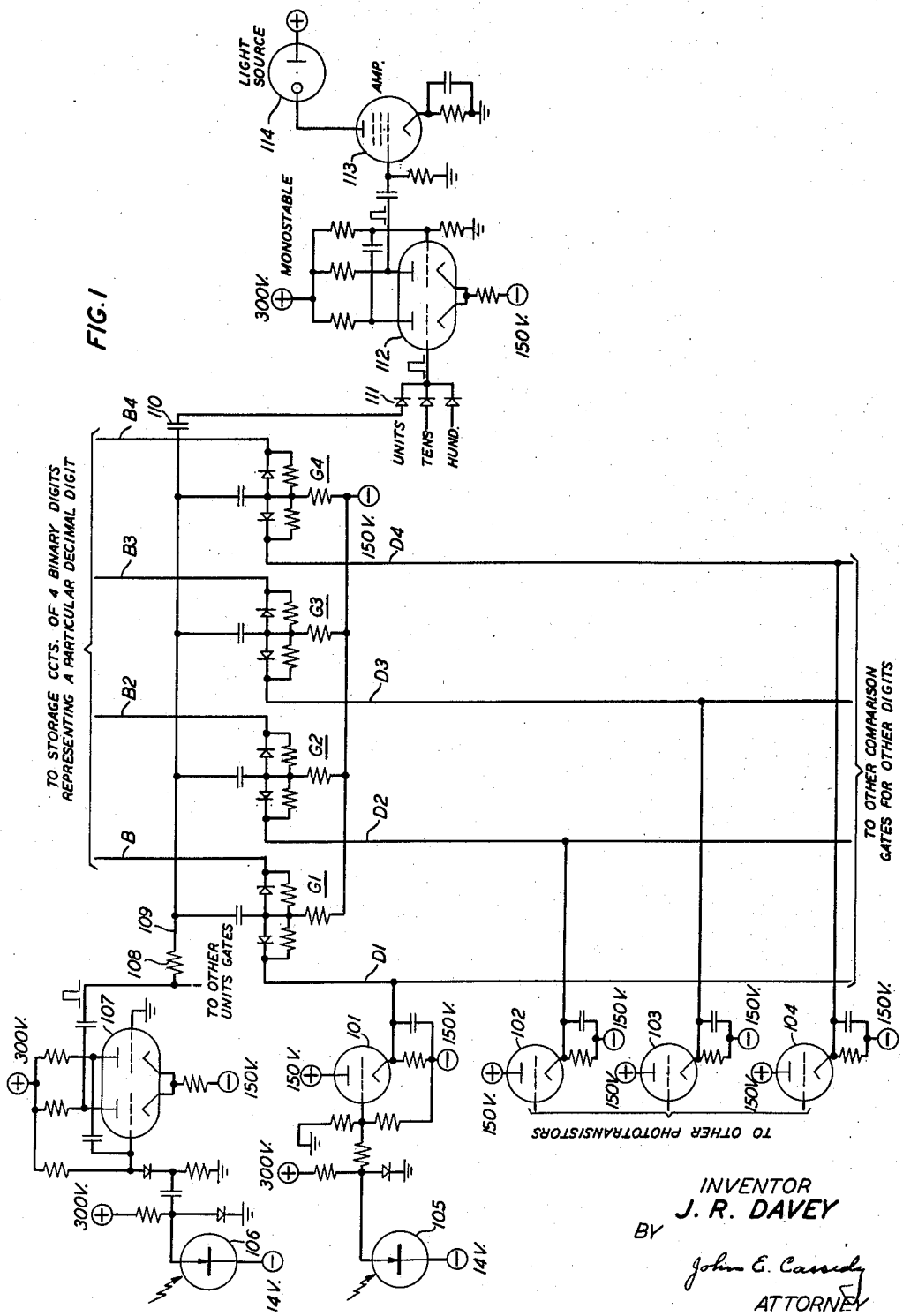
Fig. 1 shows a circuit in which the present gate is incorporated.

It is particularly pointed out that the comparison gate of the present invention is a component of a circuit rather than a complete entity. As mentioned in the foregoing it is intended to identify which of two predetermined voltage conditions is being applied to one side of the gate, by comparing it with voltage conditions applied to the opposite side of the gate. The gate may be arranged, for instance, in such manner that when a particular one of the two predetermined voltage conditions is being applied thereto and the condition is identified as being a particular condition by means of the voltage comparison effected by the gate, a cooperating circuit controlled by the gate is conditioned to perform some function. Thus, it is to be understood that a single comparison gate will frequently be arranged so that it functions as a single control for a cooperating circuit. The gate effects its control by presenting a high or low shunt impedance, which either permits or prevents a pulse, produced in a cooperating circuit, to by-pass the gate or to be shunted through the gate. It is to be understood also that a number of gates may be used cooperatively as a group, to simultaneously test a number of incoming voltages applied to a corresponding number of gates in the group. Dependent upon whether or not each of the voltage elements of a first combination of voltage elements, applied simultaneously to one side of each gate of a group of gates, match the potential conditions of each of the voltage elements of a second combination applied to the opposite side of each gate in the group, the first combination will be accepted or rejected. In this case, the acceptance will depend upon the shunt impedance of the gates arranged in parallel.

In the patent application mentioned in the foregoing, a number of groups of gates are employed to determine the decimal value of a number of groups of binary code signal combinations. A number of 4-digit binary signal combinations of voltages, each defining a decimal digit forming part of two multidigit numbers, incoming to a signal receiver, are applied to a corresponding number of sets of gates. A number of 4-digit binary signal combinations of voltages, generated locally at the receiver, are applied to the opposite side of each group of gates. The locally generated combinations define all possible digits from 0 to 9. The incoming signal combinations are maintained on one side of the gates while the locally generated combinations are applied in rapid succession repeatedly to the opposite side of the gates. Each time the combinations match, indicating that the decimal number defined by the two compared combinations in each group is the same, the component gates of the group are all placed in their high shunt impedance condition, and a pulse, generated simultaneously in the receiver, is permitted to by-pass the input of the gates without being shunted thereby. The passed pulse causes the illumination of a lamp which displays the identified decimal numerals of the multidigit number on a rotating number wheel. In the arrangement of the patent, a 3-digit number defining one item of information is identified and displayed on one portion of the number wheel and simultaneously a 2-digit number defining another item of information is displayed on another portion of the wheel. In order to do this five groups of gates are required, three groups for the 3-digit number and two groups for the 2-digit number. Four of the groups of gates have four individual gates each, so that each may compare 4-digit binary code signal combinations necessary to define any of the ten digits 0 to 9. The fifth "group" which is required to designate only a 0 or a 1 in the hundreds position of the 3-digit number requires only one gate. Thus, in the system of the identified application 17 gates are employed to define 17 bits of information. In one embodiment of the present invention, 17 gates in accordance with the present invention will replace the 17 gates of the system of the identified patent application.

The improved gate of the present invention, for reasons to be made clear hereinafter has three advantages. First, when it is required to be in the high shunt impedance condition, it presents a higher D.C. impedance than could be presented by gates heretofore known. Second, the pulse current which may be handled is not definitely limited. Third, it presents a high control impedance which is independent of the pulse current.

It is considered that an understanding of the present invention may be facilitated by an explanation of how the new gate of the present invention functions when incorporated in such a system as is disclosed in the identified patent application as an improvement over the corresponding gate shown in that application. Therefore, the system of the application will be described generally, so far as is required, as an aid in understanding a preferred embodiment in which the present invention may be incorporated.

Figure 2:
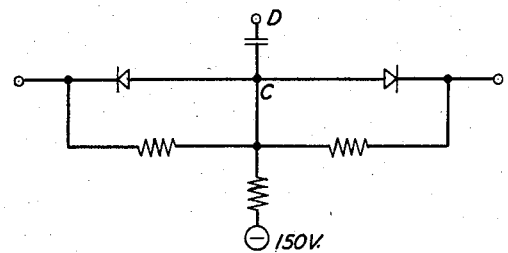
Fig. 2 shows the comparison gate of the present invention.

The individual diode comparison gate of the present invention is shown in Fig. 2. Four such gates, gates G1 to G4, are shown in Fig. 1 incorporated in a binary code to decimal number display circuit generally corresponding to that of Fig. 7 of the identified patent application. The circuit will first be described broadly and then the new gate will be described in detail.

Refer now to Fig. 1 which shows a circuit having four gates arranged in accordance with the present invention. The four gates shown in detail in Fig. 1 are designed to compare the potentials of four signal elements, received from a distant station, which define a 4-digit binary number, with the potentials of four other signal elements generated locally, which also define a 4-digit binary number. This number is the units component of a 3-digit decimal number. Four other groups of gates, not shown, are required for the complete circuit to identify one 3-digit decimal number and one 2-digit decimal number, two for the tens and hundreds position of the 3-digit decimal number and two for the tens and units position of the 2-digit decimal number. The four conductors shown extending to a bracket designated "To storage circuits of four binary digits representing a particular decimal digit" are assumed to connect through the storage circuits to a source of incoming signals being received from a distant station. It is the function of the four gates of Fig. 1 to identify the decimal digit defined by the incoming signal code combination. The circuit is arranged, as described in the patent application identified in the foregoing, so that the conditions defining a particular received decimal number, and applied through conductors B1 to B4 to the right-hand terminal of each of the four gates G1 to G4, persist, while locally generated comparing combinations, defining each of the decimal numbers from 0 to 9 are applied through conductors D1 to D4 to the opposite terminal of each of the gates. The received combinations defining some one digit from 0 to 9 remain throughout an interval. During this interval the locally generated binary signal combinations defining each digit from 0 to 9 are applied to the opposite terminal of the gate in rapid succession and each succession is repeated a number of times. During each such repetition the locally generated combination and the incoming signal combination will match for some particular numeral. The locally generated combinations are produced in response to the passage of light through a rotating code wheel such as that shown in Fig. 4. The code combinations defining each digit from 0 to 9 are impressed on four phototransistors, only one of which, phototransistor 105, is shown in Fig. 1. The conditions produced thereby are then passed to four cathode followers 101 to 104 which in turn impress either of two voltage conditions on each of the gates G1 to G4.

Figure 4:
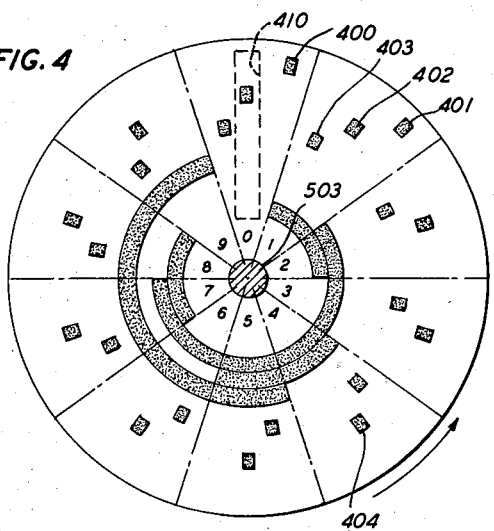
Fig. 4 is used in explaining the invention and shows a code disc on which the code shown in Fig. 3 is imposed and shows also three timing tracks for controlling the illumination of the number display lamp.

As indicated in Fig. 4, the code wheel which produces the local codes for comparison with the incoming codes is divided radially into ten segments. The inner portion of the wheel is provided with four concentric rings which are perforated in the darkened areas as indicated in Fig. 4. As each of the ten segments of the code disc shown in Fig. 4 is rotated successively between a single source of continuous light 410 and the four opposed code phototransistors, a binary code combination, defining the decimal number of the segment, is impressed on the four code phototransistors, one for each element of the code. During each individual rotation of the code disc of Fig. 4, ten such binary code combinations will be produced defining the ten numerals from 0 to 9. These will be impressed on the four phototransistors such as phototransistor 105 which will produce the voltage conditions on the four gates G1 to G4 as described. The disc of Fig. 4 and the numeral display disc of Fig. 5 may be mounted on the same shaft and rotated at relatively high speed, 5,000 revolutions per minute, for instance. The code combinations produced by the rotating code wheel will be repeated many times while each incoming signal combination from the distant station persists. To anticipate, once each revolution a lamp will be lighted each time the compared combinations match, illuminating a numeral on the number wheel of Fig. 5 for each matching combination.

Figure 5:
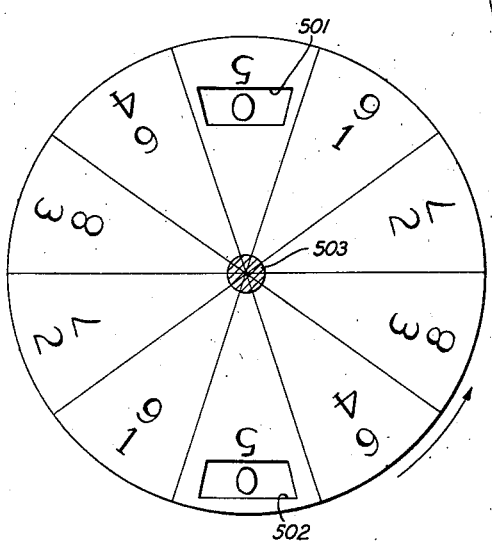
Fig. 5 shows a number display disc on which numbers are illuminated, which is used in explaining the invention.

The ten segments of the disc of Fig. 4 are numbered starting at 0 in the top segment and increasing numerically clockwise from 1 to 9 in the other segments. The disc of Fig. 4 in addition to the four inner concentric circles perforated in accordance with the binary code to define the decimals from 0 to 9, has three additional outer concentric perforated rings. The three outer concentric rings control the timing of the illuminations of two lamps. One of these lamps is lamp 114 which illuminates the 3-digit number. A corresponding lamp not shown illuminates the 2-digit number. The lamps are positioned behind each of the two apertures 501 and 502 of the number wheel of Fig. 5. The arrangements produce a 3-digit decimal number in the upper aperture 501 of the disc and a 2-digit decimal number in the lower aperture 502. The 3-digit number is never required to be greater than 199. It is necessary, therefore, to define only a 0 or a 1 in the hundreds position of the 3-digit number. The outermost track of the three tracks controls the illumination of the hundreds digit and, therefore, has an aperture in but two segments, segment 0 and segment 1. Aperture 400 controls the illumination of a 0 in the hundreds position of the 3-digit number and aperture 401 controls the illumination of a 1 in the hundreds position of the 3-digit number. When segment 1 is in position so that the binary code for numeral 1 is being impressed on the four phototransistors, such as phototransistor 105, aperture 401 for the 1 digit in the hundreds position, aperture 402 for the 1 digit in the tens position and aperture 403 for the 1 digit in the units position will be presented to the light. This light will impinge upon an individual phototransistor for each of the three apertures, such as phototransistor 106 in Fig. 1 which is controlled by aperture 403 for the units position of the 3-digit number. The pulse produced in phototransistor 106 will be impressed upon monostable multivibrator 107 which produces a positive pulse of about 50-microsecond duration and of large amplitude. If the code incoming from the distant terminal at this instant defines a 1 for the units position of the 3-digit number, the circuit is arranged so that the pulse which passes through resisdstor 108 to conductor 109 will not be shunted by the gates G1 to G4, the impedance of all of which will be in their high condition, for reasons to be explained hereinafter. The pulse will, therefore, pass through capacitor 110 and diode 111 to monostable multivibrator 112, which applies a 50-microsecond positive pulse, to amplifier 113, activating the amplifier and illuminating light source 114. The disc of Fig. 5 is positioned relative to the disc of Fig. 4, both on common shaft 503 which is rotatable at high speed, so that when segment 1 of the disc of Fig. 4 is passing before the light source, numeral 1 in both the inner and outer ring of the disc of Fig. 5 will be in alignment with a light source. If the incoming code from the distant station defines a 1 in the units position of the 3-digit number, aperture 403 will cause lamp 114 to light when the numeral 1 of the disc of Fig. 5 is in registry with the right-hand portion of the upper aperture in Fig. 5. If the tens digit of the 3-digit number is a 4, for instance, the combination defining a 4 as received from the distant terminal will be impressed through four conductors such as B1 to B4 on four terminals of four gates in a second group of gates, not shown in Fig. 1. They will be tested by code combinations produced by the same code wheel for Fig. 4 which will be impressed in parallel on one side of all of the gates in each group of gates. As aperture 404 passes before the light source 410 of the disc of Fig. 4, and while the combination defining a 4 is impressed on the four phototransistors such as phototransistor 105, light source 114 will be again illuminated as numeral 4 is in registry with the position for the tens digit of a 3-digit number in the upper aperture of the disc of Fig. 5. In like manner the hundreds digit is illuminated on the disc of Fig. 5.

Simultaneously, the code combinations defining the two digits of the 2-digit decimal number will be determined by two other gates under control of the combinations produced by the same code wheel of Fig. 4. The number will be illuminated in the lower aperture of the number disc of Fig. 5. The two decimal number apertures of the disc of Fig. 5 are each provided with an individual light source. Light source 114 illuminates all three numerals of the 3-digit number. As indicated in Fig. 1 a separate gate group is required for the units, tens and hundreds digit, but they all connect to the single light source 114. The digit identified by comparison by each gate as being the incoming digit for each of the three positions in the incoming number will cause the light source 114 to flash each time it is identified. Three numbers will be lighted in the upper aperture during each rotation of the disc of Fig. 5. The numbers will not be lighted at the same instant, but due to the frequency of lighting and the persistence of vision, will appear to be continually lighted. Because of the displacement circumferentially of the timing apertures, the units, tens and hundreds digits will be lighted only when each is in its proper position in the aperture.

Attention is called to the arrangement of the two concentric rings of digits on the disc of Fig. 5 and their relation to the top and bottom apertures 501 and 502 in that disc. It will be observed that, on the two rings, the same numerals are spaced, as are the apertures, 180 degrees apart. The value of the numeral in each aperture at any time is the same. Therefore, it is possible to display them by using an individual light source for each aperture under control of a single code wheel such as that of Fig. 4. There is, however, one point to which attention is called. The numbers on the two rings in Fig. 5 enter their respective apertures from different directions. Therefore, the apertures such as 402 and 403 in the timing rings of Fig. 4, instead of controlling the lighting of the tens and units position digits respectively, as in the upper aperture 501, control the lighting of the units and tens position digits, respectively, in the lower aperture 502.

Figure 6:
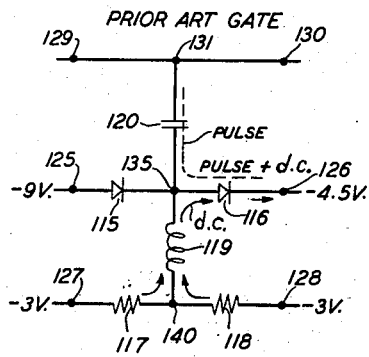
Figs. 6, 7 and 8 show a comparison gate, known in the art, under different voltage conditions applied thereto, used in explaining the invention.
Figure 9:
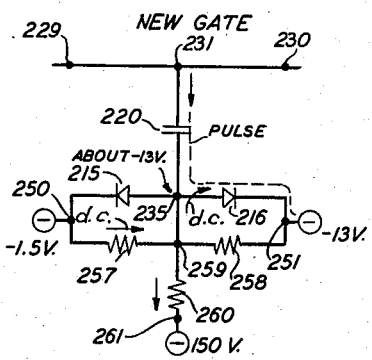
Figs. 9, 10 and 11 show the new gate of the present invention under different voltage conditions applied thereto and are used in explaining the invention.
Figure 7:
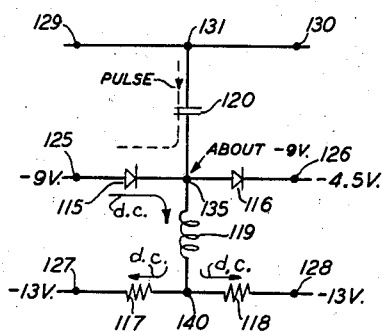
Figure 10:
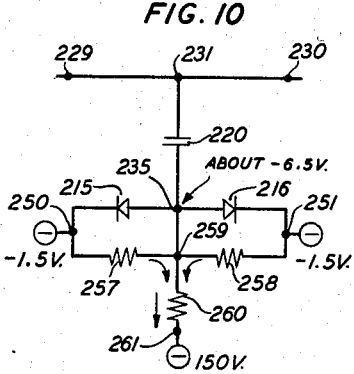
Figure 8:
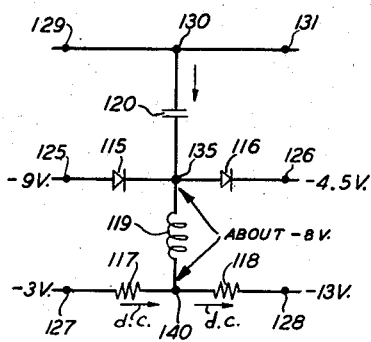
Figure 11:
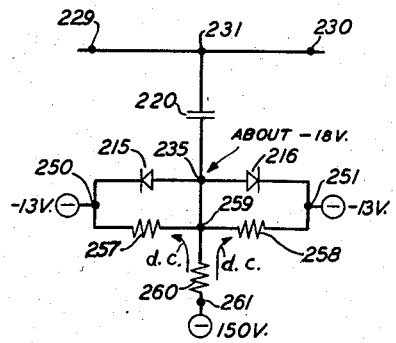

The comparison gate of the prior art is shown for the different voltage conditions applicable thereto in Figs. 6, 7 and 8 and the gate of the present invention in Figs. 9, 10 and 11. These will now be compared.

In the following where values of constants are cited it is to be understood that the citations are by way of example only, and the values cited are not to be considered as limitations.

Refer now to Figs. 6, 7 and 8. In these figures it is assumed that the incoming signal potentials are applied to terminal 128. The locally generated signal potentials are applied to terminal 127. Constant potentials —9 volts and —4.5 volts, respectively, are applied to terminals 125 and 126. The timing pulse which activates the light source is applied to terminal 129 and the light source to terminal 130.

It will be assumed that the magnitudes of the potentials applied to each of the opposite terminals 127 and 128 for the two signaling conditions applicable thereto may be either —3 volts or —13 volts, and further, that when the signal elements are each of the same condition, the marking condition, for instance, one terminal will have —3 volts applied thereto and the other will have —13 volts applied thereto. When the potentials applied to each of the terminals 127 and 128 are the same, that is, when a potential of —3 volts is applied to both terminals 127 and 128, or when a potential of —13 volts is applied to both terminals 127 and 128, the conditions of the two signal elements being compared do not match, that is to say, one signal element will be of the marking condition, for instance; and the other will be of the spacing condition.

It is required that when the conditions of the two signal elements being compared match each other, the gate shall present a high impedance to the positive pulse generated at the phototransistor connected to terminal 129 so that the pulse passes to terminal 130 to light the lamp such as lamp 114. It is required further that when the two conditions do not match, the gate presents a low shunt impedance, so that the pulse is shunted by the gate.

The magnitudes of resistors 117 and 118 are the same and are relatively low for reasons to be explained.

Reference to Fig. 6 shows the condition of the old gate when the magnitude of the potentials applied to terminals 127 and 128 is —3 volts for each. For this condition, the left-hand terminal of diode 116 becomes more positive than its right-hand terminal so that diode 116 presents a low impedance to the positive pulse. Both the direct biasing current and the positive pulse will pass through diode 116. The only limitation on the magnitude of a pulse which may be passed by diode 116 is the current carrying capacity of diode 116 for the combined currents.

Fig. 7 shows the conditions prevailing when —13 volt signal elements are applied to each of terminals 127 and 128. For this condition, the diode 115 assumes a low impedance condition for the direct biasing current flowing from the —9 volt source through inductor 119 and resistors 117 and 118, in parallel, to the —13 volt potentials connected to terminals 127 and 128. The positive pulse from terminal 129 passes through terminal 131, capacitor 120 and diode 115 to the —9 volt source connected to terminal 125, as long as its magnitude remains less than the biasing current flowing in the opposite direction through diode 115. When the pulse current tends to exceed the bias current, the potential of terminal 135 becomes more positive than that of the source connected to terminal 125 and conduction through diode 115 ceases.

In order to increase the magnitude of the pulse current of the positive pulse which may be passed before diode 115 cuts off, resistors 117 and 118 are made considerably smaller than desirable and inductor 119 is required to be introduced into the circuit to increase the impedance presented to the pulse. However, the low magnitude of resistors 117 and 118 reduces the control impedance of the gate and severely loads the circuits furnishing the conditioning potentials to terminals 127 and 128. When it is considered that, as shown in Fig. 1, the same reference code combinations may be used with several groups of comparison gates, it is apparent that the old low impedance gate is of limited utility.

Fig. 8 shows the high impedance condition of the old gate. When the signal conditions match, that is when both are marking or both are spacing, either terminal 127 or 128 may have a potential of −3 volts or −13 volts applied to it, and the opposite terminal will have −13 volts or −3 volts applied to it, so that −3 volts is applied to either terminal and −13 to the other. For this condition the steady state potential of terminal 140 and of terminal 135 becomes approximately −8 volts. This produces a high resistance condition in both diodes 115 and 116, as the potential of the left-hand terminal of each of diodes 115 and 116 is more negative than that of its right-hand terminal. This prevents the pulse from being shunted by the gate and the pulse from the phototransistor passes to the light source. However, it will be noted that the pulse amplitude will be limited to about positive 3.5 volts at which voltage diode 116 becomes conducting. A pulse more positive than 3.5 volts, when combined with the −8 volt condition applied to terminal 135 would make terminal 135 and the left-hand terminal of diode 116 positive with respect to the −4.5 volt potential applied to the right-hand terminal of diode 116. Diode 116 would conduct and produce an undesired shunting effect for this condition.

Refer now to Figs. 9, 10 and 11 which show the voltage and impedance conditions for the new gate of the present invention. In the following it will be assumed that the pulse applied to terminal 229 in Figs. 9, 10 and 11 for each of the described conditions is a positive 5-volt pulse. As may be seen from a comparison of these figures with those of the old gate, the new gate differs from the old in a number of respects. The new gate is arranged so that when potentials of the same magnitudes, which may be for instance −1.5 volts or −13 volts, are applied to the opposite terminals 250 and 251 of the new gate simultaneously, the new gate is in its high impedance condition. And when the magnitudes of the potentials applied to terminals 250 and 251 do not match, that is, when −1.5 volts, for instance, is applied to either terminal and −13 volts, for instance, is applied to the other terminal, the gate is in its low impedance condition.

Resistors 257 and 258 in the new gate are equal, as is the case of resistors 117 and 118 in the old gate. However, whereas resistors 117 and 118 are required to be of relatively low magnitude, a few thousand ohms, for instance, for reasons made clear in the foregoing, resistors 257 and 258 are each of relatively high magnitude, 39,000 ohms, for instance. An inductor, such as inductor 119 in the old gate, is not required in the new gate. The left-hand terminals of diodes 215 and resistor 257 are directly connected at terminals 250. The right-hand terminals of diode 216 and resistor 258 are directly connected at terminal 251. Diode 215 which corresponds generally to diode 115 in the old gate has its polarity reversed with respect to that of diode 115. The voltages to be compared are applied directly to terminals 250 and 251. The sources of fixed potential, such as the −9 volts applied to terminal 125 and the −4.5 volts applied to terminal 126 of diodes 115 and 116, respectively, of the old gate are not employed. In the new gate a source of fixed relatively high potential, −150 volts for instance, is connected through a resistor 260 to the junction between resistors 257 and 258. Resistor 260 is of relatively large magnitude, 560,000 ohms for instance. There is no corresponding potential source or resistor connected to terminal 140 in the old gate. These differences afford improved operations of the new gate over the old gate which will now be described.

Refer now to Fig. 9. It is assumed that the voltage conditions applied to terminals 250 and 251 are not matching, that is, that −1.5 volts is applied to either terminal, terminal 250, for instance, and that −13 volts is applied to the other. For this condition the gate of Fig. 9 shunts the pulse. The potential of terminals 259 and 235, which electrically constitute a common point, become slightly more positive than that of terminal 251 and diode 216 assumes its low resistance condition. The positive pulse from terminal 229 is diverted at terminal 231 through capacitor 220 and diode 216 to terminal 251. From the symmetry of the gate it will be apparent that with reversed conditions applied to terminals 250 and 251, diode 215 will pass the pulse in a like manner.

Refer now to Fig. 10. For this condition it is assumed that −1.5 volts is connected to each of terminals 250 and 251. The relative values of resistors 257, 258 and 260 are such that the potential of terminals 259 and 235 become about −6.5 volts. The right-hand terminal of diode 215 becomes more negative than its left-hand terminal. The left-hand terminal of diode 216 becomes more negative than its right-hand terminal. As disclosed in Fig. 10, according to the convention, each of diodes 215 and 216 is in the high resistance condition for potentials of the applied polarity. Therefore, the gate of Fig. 10 present a high impedance to a positive pulse from terminal 229 which, therefore, passes through terminal 230 to the light source, such as lamp 114. The amplitude of the pulse will be limited to about positive 5 volts.

Refer now to Fig. 11. For the condition shown in Fig. 11, in which −13 volts is assumed to be connected to each of terminals 250 and 251, the potential of terminals 259 and 235 becomes about −18 volts. Each of diodes 215 and 216 presents a high resistance to such polarities. The gate assumes its high impedance condition and the pulse from terminal 229 passes through terminal 230 to the light source. Again the pulse amplitude is limited to about positive 5 volts.

It will be observed that the new gate is symmetrical as compared to the old gate. That is to say, whenever the gate is to act as a shunt, it is arranged as in Fig. 9. The current is limited only by the current carrying capacity of diode 216 or 215 for the combined pulse and the direct biasing current. The magnitude of the latter is relatively small, only a few mils, so there is substantial reserve for a relatively large pulse. For the conditions of Fig. 10 and 11, for each of which the gate is required to present a high impedance, the impedance will be determined largely by the magnitude of resistors 257 and 258, which as stated are each approximately 39,000 ohms. These connected as they are in parallel will present an impedance of substantially half this amount which is, however, 10 to 15 times greater than that of the old gate. Substantial numbers of the new gate units may, therefore, be connected in parallel and the parallel impedance of the group will nevertheless be appreciable.

Attention is called to the fact that the old gate permits a pulse to pass to illuminate the light source for the decimal number display when the potential comparison is of opposite sense, that is to say when the potentials applied to terminals 127 and 128 are substantially different as in Fig. 8 rather than the same as in Figs. 6 and 7. Contrasted with this the gate of the present invention permits a pulse to pass to illuminate the light source when the comparison is of the same sense. In Fig. 10, for instance, a pulse is passed when the potentials applied to terminals 250 and 251 are each −1.5 volts. In Fig. 11 a pulse is passed when the potentials applied to these terminals are each −13 volts.

In Fig. 9 a pulse is shunted when the potentials applied to terminals 250 and 251 are of the opposite sense, that is, when one is −1.5 volts and the other is −13 volts.

Figure 3:
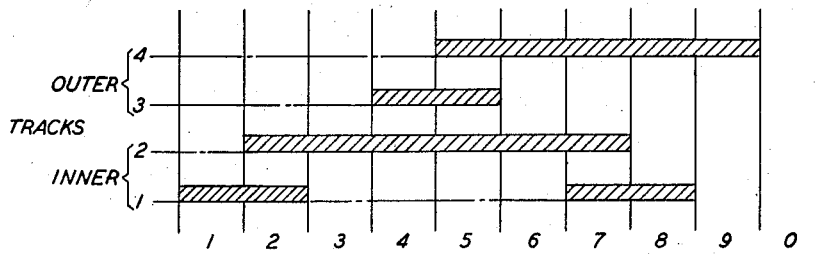
Fig. 3 shows a well-known 4-digit binary code arrangement used in explaining the invention.

The present gate may be operated under the potential conditions explained in the foregoing by making either one of two changes in the cooperating controls of the old gate. These are: (1) The 4-digit code pattern on the disc of Fig. 4 may be reversed from that shown on Fig. 4 of the application identified in the foregoing. (2) The polarities of the four code phototransistors, such as phototransistor 105 of Fig. 1 in the present disclosure, may be reversed with respect to the polarity of the code phototransistors of the old gate. This latter method was used in the present arrangement. It will be observed that the code arrangement of the new gate, as shown developed in Fig. 3 and on the code disc of Fig. 4, is the same as that of the code disc of the old gate as shown in Fig. 4 of the identified patent application while the polarity of the potentials applied to the code phototransistor, such as phototransistor 105 of Fig. 1 in the present disclosure, is opposite from that applied to code phototransistor 61 of Fig. 6 of the identified application.

What is claimed is:

1. A gate circuit for comparing two potentials, said circuit having means therein responsive to a comparison of said potentials for switching the shunt impedance of said circuit between relatively high and low values, said means comprising a first and a second diode and a first and a second resistor, each of said resistors of relatively large magnitude, an individual one of said diodes and an individual one of said resistors connected in parallel in a first and second arm of said gate respectively, a first, second and third terminal, said first and said second arms connected exteriorly to said first and second terminals respectively, said first and second arms connected interiorly to said third terminal, a source of fixed potential connected through a third resistor of relatively large magnitude to said third terminal, a pulse source connected through a fourth terminal to a work circuit, said fourth terminal connected through a capacitor to said third terminal, each of said diodes having a terminal of like polarity connected to said third terminal, and means for impressing potentials on said first and second terminals for comparison.

2. A diode gate for comparing potentials, said gate having a first and a second terminal, means for impressing potentials on said terminals for comparison, a third terminal, a first diode and a first resistor of relatively large magnitude connected in parallel between said first and said third terminals, a second diode and a second resistor of relatively large magnitude connected in parallel between said second and third terminals, each of said diodes having a terminal of like polarity connected to said third terminal, a source of fixed potential connected through a third resistor of relatively large magnitude to said third terminal, a pulse source connected through a fourth terminal to a work circuit and a path from said fourth terminal through a capacitor to said third terminal.

3. A potential comparison gate for comparing potentials, said gate having means incident to said comparison for switching said gate to a relatively high or low shunt impedance condition, said means comprising a path from a pulse source to the midpoint of two arms of said gate, each of said arms having an individual diode and an individual resistor connected directly in parallel from said midpoint to an individual terminal for each of said arms, each of said diodes having a terminal of like polarity connected to said midpoint, a path extending from said midpoint directly through a resistor to a source of fixed potential, and means for applying potentials to said individual terminals for comparison.

4. A diode potential comparison gate having means therein for producing a high or low impedance incident to the comparison of two potentials applied to said gate, said gate having means incident to the comparison of two substantially equal potentials of a first value for producing a high impedance in said gate, said gate having means incident to the comparison of two substantially equal potentials of a second value, substantially different from said first value, for producing a high impedance in said gate, said gate having means incident to the comparison of two potentials of substantially different magnitudes, one from the other, for producing a low shunt impedance in said gate, all of said means comprising two circuits, each of said circuits having two parallel branches, one of said branches having a high impedance element and the other of said branches having a diode, each of said diodes having an electrode of like polarity connected to a common point.

References Cited in the file of this patent

UNITED STATES PATENTS

| | | |
|---|---|---|
| 2,715,718 | Holtje | Aug. 16, 1955 |
| 2,734,134 | Beard | Feb. 7, 1956 |
| 2,752,489 | Algrain | June 26, 1956 |
| 2,781,448 | Struven | Feb. 12, 1957 |